United States Patent
Strasser et al.

(10) Patent No.: US 11,167,662 B2
(45) Date of Patent: Nov. 9, 2021

(54) METHOD FOR OPERATING AN ELECTRICAL ENERGY STORAGE DEVICE FOR A MOTOR VEHICLE, AND CORRESPONDING ENERGY STORAGE DEVICE

(71) Applicant: AUDI AG, Ingolstadt (DE)

(72) Inventors: Roman Strasser, Gaimersheim (DE); Johann Scherer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 65 days.

(21) Appl. No.: 16/766,053

(22) PCT Filed: Oct. 15, 2018

(86) PCT No.: PCT/EP2018/078085
§ 371 (c)(1),
(2) Date: May 21, 2020

(87) PCT Pub. No.: WO2019/101443
PCT Pub. Date: May 31, 2019

(65) Prior Publication Data
US 2020/0346559 A1    Nov. 5, 2020

(30) Foreign Application Priority Data
Nov. 24, 2017 (DE) .......................... 102017221033.8

(51) Int. Cl.
*H02J 7/00* (2006.01)
*H02J 7/14* (2006.01)
(Continued)

(52) U.S. Cl.
CPC .............. *B60L 58/22* (2019.02); *B60L 53/22* (2019.02); *B60L 58/12* (2019.02); *B60L 58/19* (2019.02);
(Continued)

(58) Field of Classification Search
USPC .......................................................... 320/134
See application file for complete search history.

(56) References Cited

U.S. PATENT DOCUMENTS 6,304,059 B1    10/2001  Chalasani et al.
6,353,304 B1     3/2002  Atcitty et al.
(Continued)

FOREIGN PATENT DOCUMENTS

DE    102004041722 A1    3/2006
DE    102013102576 A1    9/2014
(Continued)

OTHER PUBLICATIONS

English-language translation of International Preliminary Report on Patentability dated May 26, 2020, in corresponding International Application No. PCT/EP2018/078085; 8 pages.

(Continued)

*Primary Examiner* — Alexis B Pacheco
(74) *Attorney, Agent, or Firm* — Maier & Maier, PLLC

(57) ABSTRACT

A method for operating an electrical energy storage device for a motor vehicle, which energy storage device includes an energy storage unit, which has an energy storage unit voltage during normal operation, and which, during a charging process, is charged by electrical energy provided at a charging connection point at a charging voltage that is lower than the energy storage unit voltage. Based on the energy storage unit voltage and the charging voltage, the energy storage unit is divided into a plurality of energy storage subunits, at least one of which has an energy storage subunit voltage that corresponds to the charging voltage and is electrically connected to the charging connection point for the at least partial charging of the energy storage unit.

20 Claims, 1 Drawing Sheet

(51) Int. Cl.
  *B60L 58/22* (2019.01)
  *B60L 53/22* (2019.01)
  *B60L 58/19* (2019.01)
  *B60L 58/12* (2019.01)
  *B60L 58/21* (2019.01)
  *B60L 58/20* (2019.01)

(52) U.S. Cl.
  CPC .............. *B60L 58/20* (2019.02); *B60L 58/21* (2019.02); *H02J 7/0014* (2013.01); *H02J 7/0024* (2013.01); *B60L 2240/547* (2013.01); *B60L 2240/549* (2013.01)

(56) References Cited

U.S. PATENT DOCUMENTS

| | | | |
|---|---|---|---|
| 7,859,223 B2* | 12/2010 | Gorbold | G01R 31/396 |
| | | | 320/119 |
| 8,928,276 B2* | 1/2015 | Kesler | H02J 50/60 |
| | | | 320/108 |
| 11,114,866 B2* | 9/2021 | Straßer | B60L 53/305 |
| 2012/0256568 A1 | 10/2012 | Lee | |
| 2012/0274283 A1* | 11/2012 | van Lammeren | ............ |
| | | | H01M 10/4207 |
| | | | 320/118 |
| 2014/0239879 A1 | 8/2014 | Madsen | |
| 2014/0312828 A1* | 10/2014 | Vo | H02J 7/342 |
| | | | 320/103 |
| 2014/0368041 A1 | 12/2014 | Tu et al. | |
| 2015/0137736 A1* | 5/2015 | Lucea | H02J 7/0018 |
| | | | 320/104 |
| 2017/0141596 A1 | 5/2017 | Hansen | |
| 2019/0103750 A1* | 4/2019 | Kristensen | H02J 7/0016 |

FOREIGN PATENT DOCUMENTS

| | | |
|---|---|---|
| DE | 102014200336 A1 | 7/2015 |
| DE | 102014201354 A1 | 7/2015 |
| DE | 112014001669 T5 | 12/2015 |
| DE | 102014016620 A1 | 4/2016 |
| DE | 102015004119 A1 | 10/2016 |
| DE | 102015106771 A1 | 11/2016 |
| DE | 102015106773 A1 | 11/2016 |
| DE | 102016015311 A1 | 7/2017 |
| DE | 102016015316 A1 | 7/2017 |
| DE | 102016200769 A1 | 7/2017 |
| DE | 102016201520 A1 | 8/2017 |
| DE | 102016207272 A1 | 11/2017 |
| DE | 102016208893 A1 | 11/2017 |
| EP | 2541724 A1 | 1/2013 |
| EP | 2548259 A1 | 1/2013 |

OTHER PUBLICATIONS

Examination Report dated Nov. 13, 2019 in corresponding German application No. 102017221033.8; 20 pages.
International Search Report and Written Opinion dated Feb. 13, 2019 in corresponding application No. PCT/EP2018/078085; 25 pages.

* cited by examiner

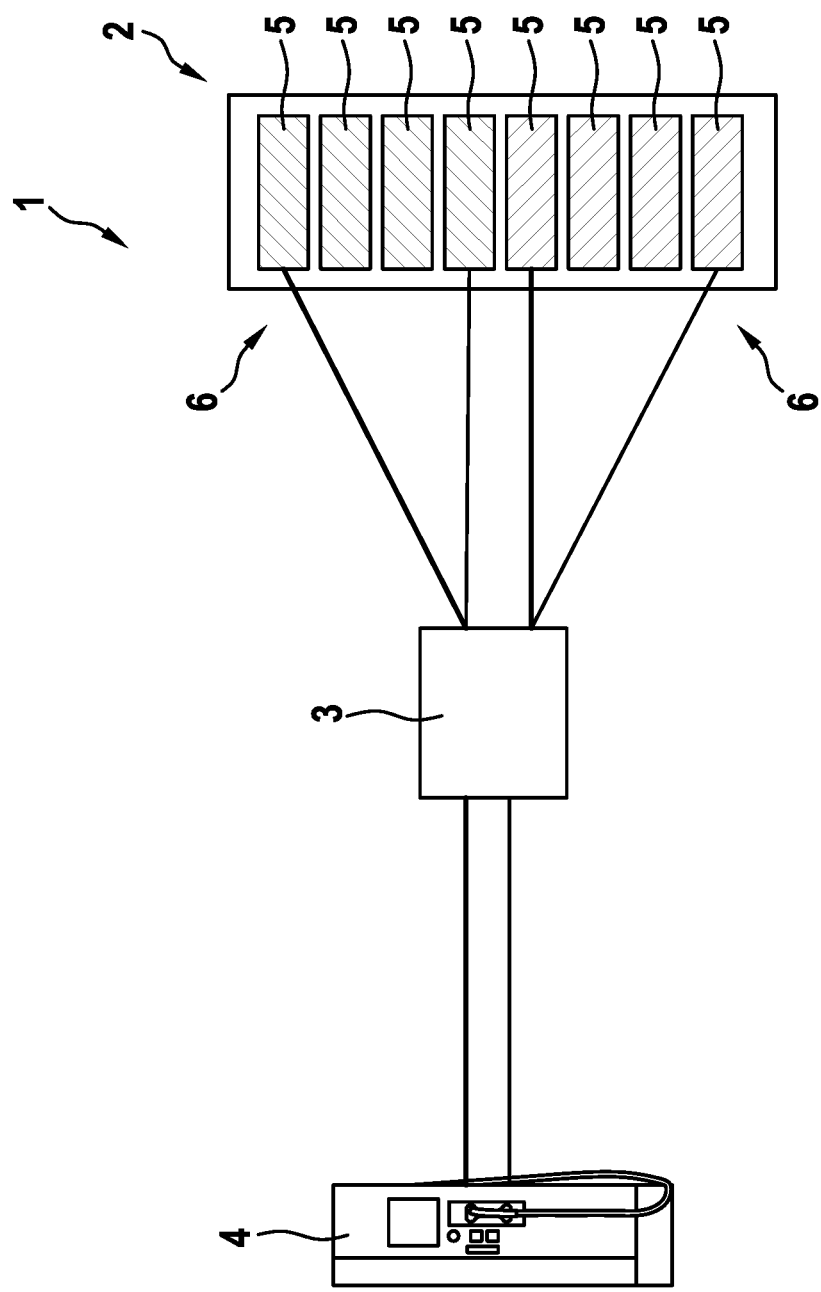

METHOD FOR OPERATING AN ELECTRICAL ENERGY STORAGE DEVICE FOR A MOTOR VEHICLE, AND CORRESPONDING ENERGY STORAGE DEVICE

FIELD

The invention relates to a method for operating an electrical energy storage device for a motor vehicle, wherein the energy storage device is equipped with an energy storage unit, which has an energy storage unit voltage during normal operation and which during a charging process is charged with electrical energy provided at a charging connection point at a charging voltage that is lower than the energy storage unit voltage, and wherein, based on the energy storage unit voltage and the charging voltage, the energy storage unit is divided into a plurality of energy storage subunits, at least one of which has a energy storage subunit voltage that corresponds to the charging voltage and is electrically connected to the charging connection point for the at least partial charging of the energy storage unit. The invention further relates to an energy storage device for a motor vehicle.

BACKGROUND

The prior art includes document DE 10 2015 004 119 A1, for example. Said document relates to a motor vehicle having an electrical energy storage unit, a first vehicle-side charging interface, and a second vehicle-side charging interface, wherein the first and second charging interfaces are coupled to the electrical energy storage unit and can each be coupled to a respective charging device outside the vehicle to allow the parallel charging of the electrical energy storage unit, wherein the first charging interface and the second charging interface are uniformly configured, so that the first charging interface can be coupled to the first charging device by means of the same coupling principle as is used for coupling the second charging interface to the second charging device.

It is the object of the invention to propose a method for operating an electrical energy storage device for a motor vehicle that offers advantages over known methods, more particularly that enables a highly efficient charging of the energy storage device or the energy storage unit.

This object is achieved according to the invention by a method for operating an electrical energy storage device. Said method provides that the energy storage unit is divided into the plurality of energy storage subunits in such a way that the energy storage subunits each have an energy storage subunit voltage that corresponds to the charging voltage and are each electrically connected to the same charging connection point for the charging of the energy storage unit, or in such a way that when the energy storage unit is divided, another of the energy storage subunits has an energy storage sub-unit voltage that is different from the charging voltage, and said energy storage subunit is connected via a voltage transformer to the same charging connection point as the one energy storage subunit, for the at least partial charging of the energy storage unit.

The electrical energy storage device is intended for use in the motor vehicle, i.e. it is preferably in the form of a component of the motor vehicle. The energy storage device is used for the temporary storage of electrical energy. The electrical energy temporarily stored in the energy storage device is used for operating an electric motor, for example, in particular a traction motor of the motor vehicle. For this purpose, the energy storage device is electrically connected to the electric motor or the traction motor and is in electrical connection with said motor at least intermittently via said connection. The traction motor is used to drive the motor vehicle and thus to supply a torque that is targeted toward driving the motor vehicle.

The energy storage device may be charged, for example, by means of a generator of the motor vehicle, with the electric motor, in particular, being used as the generator. In that case, the electric motor is operated as a generator. Alternatively or additionally, the energy storage device may be charged with electrical energy that is provided externally. This energy is preferably provided at a charging station for the motor vehicle, in particular at a charging column.

The temporary storage by the energy storage device ultimately takes place in the energy storage unit, which is a component of the energy storage device. The energy storage unit is thus in the form of a rechargeable battery and is preferably composed of a plurality of battery modules, also referred to as battery cells. The battery modules of the energy storage unit are electrically interconnected. This connection is made such that during normal operation of the energy storage device, the energy storage unit has the energy storage unit voltage, which is preferably the voltage that is required for operating the electric motor, in particular the nominal voltage.

For charging the energy storage unit, electrical energy is provided at the charging connection point, which is likewise a component of the energy storage device. For this purpose, the externally provided energy is supplied, for example, via the charging connection point, in particular by way of an electrical connection between the charging station and the charging connection point. The electrical connection may be wired, for example, or may alternatively be wireless. The electrical energy provided via the charging connection point has a charging voltage. However, this charging voltage is lower than the energy storage unit voltage.

It may be provided to convert the charging voltage to the energy storage unit voltage of the energy storage unit by means of a voltage transformer. But with such a voltage conversion losses occur, so that ultimately (even allowing for charging losses in the energy storage unit) a significantly greater amount of external energy must be expended for charging the energy storage unit than is ultimately stored temporarily in the energy storage unit for later use.

For that reason, it is provided to divide the energy storage unit into a plurality of energy storage subunits, based on the energy storage unit voltage and the charging voltage. At least one of these energy storage subunits has an energy storage subunit voltage that corresponds to the charging voltage. The energy storage subunit voltage is understood as the voltage of the respective energy storage subunit. The energy storage subunit voltage is lower than the energy storage unit voltage of the entire energy storage unit. Typically, the energy storage subunit voltages of all energy storage subunits of the energy storage unit added together total the energy storage unit voltage of the energy storage unit. To charge the energy storage unit, at least the energy storage subunit for which the energy storage subunit voltage corresponds to the charging voltage is then connected electrically to the charging connection point.

In a first variant of the method according to the invention, it is further provided to divide the energy storage unit into the plurality of energy storage subunits in such a way that the energy storage subunits each have an energy storage subunit voltage that corresponds to the charging voltage. In other words, all the energy storage subunits of the energy storage unit have the same energy storage subunit voltage, which also corresponds to the charging voltage. To charge the energy storage unit, these energy storage subunits are then electrically connected to the same charging connection point.

The energy storage unit may have an energy storage unit voltage of 800 V, for example, whereas for charging the energy storage unit, it is possible for a charging voltage of only 400 V to be provided. To achieve an energy-efficient charging of the energy storage unit, the energy storage unit is divided into two energy storage subunits, each of which has an energy storage subunit voltage of 400 V. These energy storage subunits are then connected electrically to the charging connection point for charging.

Put more concisely, the first variant of the invention thus relates to a method for operating an electrical energy storage device for a motor vehicle, wherein the energy storage device is equipped with an energy storage unit, which has an energy storage unit voltage during normal operation, and which during a charging process is charged by means of electrical energy provided at a charging connection point at a charging voltage that is lower than the energy storage unit voltage. It is provided to divide the energy storage unit into a plurality of energy storage subunits, each of the energy storage subunits having an energy storage subunit voltage that corresponds to the charging voltage, and being electrically connected to the same charging connection point for charging the energy storage unit.

In a second variant of the method according to the invention, in contrast, it is alternatively provided that when the energy storage unit is divided, another of the energy storage subunits has an energy storage subunit voltage that is different from the charging voltage, and this energy storage subunit is connected via a voltage transformer to the same charging connection point as the one energy storage subunit, for the at least partial charging of the energy storage unit. Thus, the energy storage subunit voltages of at least two of the energy storage subunits, into which the energy storage unit is divided, are different from one another. One energy storage subunit has an energy storage subunit voltage that corresponds to the charging voltage, while the other energy storage subunit has the energy storage subunit voltage that is different from the charging voltage.

The one energy storage subunit is then connected electrically to the charging connection point, specifically in such a way that the charging voltage provided at the charging connection point is applied to the one energy storage subunit. The other energy storage subunit, in contrast, is connected to the charging connection point via the voltage transformer, with the voltage transformer being operated in such a way that the charging voltage provided at the charging connection point is converted to the energy storage subunit voltage of the other energy storage subunit, which is different from the charging voltage. In other words, one of the energy storage subunits, specifically the one energy storage subunit, is electrically connected directly to the charging connection point, whereas another of the energy storage subunits, specifically the other energy storage subunit, is connected only indirectly to the charging connection point, via the voltage transformer.

Thus, although the aforementioned losses occur via the voltage transformer at the other energy storage subunit, the one energy storage subunit can be charged without such losses. Once again, the energy storage unit again has the energy storage unit voltage of 800 volts, for example. However, only electrical energy with a charging voltage of 600 V can be provided at the charging connection point. The energy storage unit is then divided into the energy storage subunits in such a way that the one energy storage subunit has an energy storage subunit voltage of 600 V and the other energy storage subunit has an energy storage subunit voltage of 200 V.

It is particularly preferably provided that the energy storage subunit having the higher energy storage subunit voltage is connected directly to the charging connection point, whereas the other energy storage subunit, which has the lower energy storage subunit voltage, is connected via the voltage transformer. Such a procedure further reduces the electrical losses via the voltage transformer.

In principle, in both variants of the method according to the invention, the energy storage unit can be divided into any number of energy storage subunits, based on the energy storage unit voltage of the energy storage unit and on the charging voltage. If only a charging voltage of 200 V can be provided at the charging connection point, for example, while the energy storage unit has an energy storage unit voltage of 800 V, the energy storage unit is preferably divided into four energy storage subunits, each with a energy storage subunit voltage of 200 V, and each of which is electrically connected to the same charging connection point for charging.

The same charging connection point is understood in this case as an electrical connection point of the energy storage device to which the external energy source is electrically connected. If multiple of these external energy sources are available to be used for charging the energy storage unit, then these multiple external energy sources are all connected to the charging connection point, and each is electrically connected at the same time to the respective energy storage subunit for charging. Thus, it is not provided for multiple external energy sources to be used at the same time in parallel for charging multiple energy storage subunits. Rather, even in the case of multiple external energy sources, each of these is connected to the respective energy storage subunit to be charged.

A preferred further embodiment of the invention provides that the energy storage subunits are electrically connected to the charging connection point sequentially or electrically in parallel. It can thus be provided to electrically connect the energy storage subunits to be charged to the charging connection point sequentially, so that at all times, exactly one of the energy storage subunits is connected to the charging connection point. This has the advantage that each of the energy storage subunits can be charged relatively quickly, because a high charging current is available for each corresponding energy storage subunit.

Alternatively, it can be provided that the energy storage subunits are electrically connected in parallel to the charging connection point. In that case, the energy storage subunits are charged simultaneously. This has the disadvantage over the sequential charging of the energy storage subunits that each individual energy storage subunit is charged more slowly. However, the total amount of time required to charge the energy storage subunits is substantially the same, and a respective final charge voltage of the energy storage subunits is always identical due to their parallel connection. Consequently, when the energy storage subunits are subsequently interconnected to form the energy storage unit, no compensating currents are emitted, which can most definitely be the case with sequential charging.

In a further embodiment of the invention it can be provided that for charging the other energy storage subunit, the charging voltage is converted by means of the voltage transformer to the energy storage subunit voltage of the other energy storage subunit. This has already been mentioned above. Since the energy storage subunit voltage is preferably lower than the charging voltage, the charging voltage is lowered by means of the voltage transformer. Such a lowering of the charging voltage can be carried out with greater energy efficiency than a raising of the charging voltage. Such a raising would be necessary if the energy storage subunit voltage were greater than the charging voltage. Therefore, the losses incurred in the voltage transformer are minimized.

A further refinement of the invention provides that the energy storage unit comprises a plurality of battery modules, and with the division of the energy storage unit, at least one of the battery modules is assigned to each of the energy storage subunits. It may be provided, for example, that the energy storage unit is divided in such a way that each of the energy storage subunits is assigned exactly one of the battery modules. Particularly preferably, however, the number of battery modules provided is greater than the number of energy storage subunits into which the energy storage unit is divided. According to the first variant of the described method, the energy storage subunits each have the same number of battery modules. In the second variant, the energy storage subunits may have or comprise different numbers of battery modules.

It is particularly preferably provided that the battery modules are assigned to the energy storage subunits dynamically by a control unit, based on the energy storage unit voltage and the charging voltage. It can be provided, for example, that prior to the start of charging, the external energy source transmits the charging voltage to the control unit, whereupon the control unit dynamically divides the energy storage unit into the energy storage subunits. Thus with a first charging voltage, the number of battery modules in the energy storage subunits or in the one energy storage subunit and the other energy storage subunit may be different from the number that is present for a second charging voltage that is different from the first charging voltage. It can also be provided that the control unit interconnects the battery modules differently with different charging processes of the energy storage device, so that with different charging processes, the same battery module is assigned to different energy storage subunits. This enables a particularly flexible division of the energy storage unit into the energy storage subunits.

A particularly preferred further embodiment of the invention provides that the energy storage subunits are charged in such a way that when charging is completed, final charge voltages of the battery modules of the energy storage subunits are the same. In other words, the energy storage subunits are each charged to the same final charge voltage, or until their final charge voltages correspond to a desired final charge voltage. This is important particularly if the energy storage subunits are connected to the charging connection point sequentially. With electrically parallel connection, in contrast, the final charge voltages necessarily correspond. Ensuring that the final charge voltages are the same once charging is completed effectively prevents compensating currents within the energy storage unit during connection of the energy storage subunits. As a result, no or only low electrical losses occur in the energy storage unit.

A further preferred embodiment of the invention provides that when charging is completed, a check is made to determine whether the final charge voltages of the battery modules are identical, and if different final charge voltages are found, the battery modules are equalized by means of an equalization controller. Different final charge voltages of the battery modules may be caused, for example, by a sign interruption in the charging of at least one of the energy storage subunits. If this is detected, i.e. if the different final charge voltages are identified, the equalization controller is then used to adjust the charge levels of the battery modules to match one another. To this end, the equalization controller is preferably provided and configured to carry out an active balancing.

During active balancing, energy is transferred from battery modules that have a higher charge to battery modules that have a lower charge, until the final charge voltages of the battery modules are identical. Such a procedure ensures that the energy storage unit can be operated with low losses even if charging is prematurely interrupted.

A further preferred embodiment of the invention provides that the series connection of the energy storage subunits is performed only after equalization by means of the equalization controller. If the energy storage subunits are connected in series, then the loads caused by different current intensities occurring in the energy storage subunits will be greater, the more the final charge voltages of the battery modules differ from one another. For that reason it is provided first to adjust the final charge voltages to match one another by means of the equalization controller, and only then to connect the energy storage subunits in series. This reduces the load on the energy storage subunits and consequently the losses that occur as a result of the series connection of the energy storage subunits.

Finally, as part of a particularly preferred embodiment of the invention, it can be provided that exactly one energy source or a plurality of electrically interconnected energy sources are electrically connected to the energy storage subunits via the charging connection point. Regardless of the number of energy sources by means of which electrical energy is provided for charging the energy storage unit, said energy sources are always electrically connected via the charging connection point to the energy storage subunits. The charging connection point is in turn connected via a switch assembly to the energy storage unit or to the energy storage subunits, so that the charging connection point can be connected selectively to one or more of the energy storage subunits.

This means, therefore, that the energy source or the multiple energy sources can likewise be electrically connected collectively to the energy storage subunit or to the energy storage subunit only via the switch arrangement. Ultimately, therefore, the multiple energy sources are connected to the charging connection point electrically parallel to one another, for example. The use of multiple energy sources for charging the energy storage unit enables faster charging, because the available charging current is greater.

The invention further relates to an energy storage device for a motor vehicle, in particular for carrying out the method according to the embodiments within the scope of this description, wherein the energy storage device is equipped with an energy storage unit, which has an energy storage unit voltage during normal operation, and which during a charging process can be charged by means of electrical energy provided at a charging connection point at a charging voltage that is lower than the energy storage unit voltage, and wherein, based on the energy storage unit voltage and the charging voltage, the energy storage unit is divided into a plurality of energy storage subunits, at least one of which has an energy storage subunit voltage that corresponds to the charging voltage and can be electrically connected to the charging connection point for the at least partial charging of the energy storage unit.

Here, it is provided that the energy storage device is configured to divide the energy storage unit into the plurality of energy storage subunits in such a way that the energy storage subunits each have an energy storage subunit voltage that corresponds to the charging voltage and are electrically connected to the same charging connection point for the charging of the energy storage unit, or that, with the division of the energy storage unit, another of the energy storage subunits has an energy storage subunit voltage that is different from the charging voltage, and said energy storage subunit is connected via a voltage transformer to the same charging connection point as the one energy storage subunit, for the at least partial charging of the energy storage unit.

The advantages of such a configuration of the energy storage device and of such a procedure have already been discussed. Both the energy storage device for the motor vehicle and the method for operating said energy storage device can be further refined according to the embodiments in the scope of this description, to which reference will therefore be made.

BRIEF DESCRIPTION OF THE DRAWING

In the following, the invention will be explained in greater detail with reference to the exemplary embodiments depicted in the drawings, without this serving to limit the invention.

FIG. a schematic diagram of an arrangement of an energy storage de-vice for a motor vehicle and an external energy source.

DETAILED DESCRIPTION

The FIGURE shows a schematic diagram of an energy storage device 1 for a motor vehicle, which is equipped with an energy storage unit 2 and a charging connection point 3. The energy storage device 1 or the energy storage unit 2 is connected via the charging connection point 3 to an external energy source, in the exemplary embodiment shown here to a charging station for the motor vehicle. The energy storage unit 2 is charged using electrical energy provided by means of the energy source 4.

The energy storage unit 2 has a plurality of battery modules 5. Based on a charging voltage provided by the energy source 4 and on an energy storage unit voltage of the energy storage unit 2, the energy storage unit 2 is divided into a plurality of energy storage subunits 6, in the exemplary embodiment shown here, two energy storage subunits 6. In other words, the battery modules 5 are allocated to the energy storage subunits 6. This is preferably done evenly, so that the same number of battery modules 5 is assigned to each of the energy storage subunits 6. Accordingly, the energy storage subunits 6 have the same energy storage subunit voltage.

In the exemplary embodiment depicted here, the energy storage unit 2 is divided in such a way that the energy storage subunit voltages of the energy storage subunits 6 correspond to the charging voltage. The energy storage subunits 6 are then connected to the energy source 4, specifically via the charging connection point 3, for charging the energy storage unit 2. During this process, the energy storage subunits 6 are connected electrically in parallel. Ultimately, this means that the energy source 4 is connected to one side of the charging connection point 3, and the parallel-connected energy storage subunits 6 are connected to the other side, for the purpose of charging the energy storage unit 2.

Using the described procedure or by means of the described energy storage device 1, even if the charging voltage is different from the energy storage unit voltage of the energy storage unit 2, an energy-efficient charging of the energy storage unit 2 can be achieved, specifically by the parallel connection of the energy storage subunits 6, each of the energy storage subunits 6 having a energy storage subunit voltage that corresponds to the charging voltage.

The invention claimed is:

1. A method for operating an electrical energy storage device for a motor vehicle, comprising:
   equipping the energy storage device with an energy storage unit, which has an energy storage unit voltage during normal operation, and which, during a charging process, is charged by electrical energy provided at a charging connection point at a charging voltage that is lower than the energy storage unit voltage, and wherein, based on the energy storage unit voltage and the charging voltage, the energy storage unit is divided into a plurality of energy storage subunits, at least one of which has an energy storage subunit voltage that corresponds to the charging voltage and is electrically connected to the charging connection point for the at least partial charging of the energy storage unit,
   wherein the energy storage unit is divided into the plurality of energy storage subunits in such a way that the energy storage subunits each have an energy storage subunit voltage that corresponds to the charging voltage and are electrically connected to the same charging connection point for the purpose of charging the energy storage unit, or
   when the energy storage unit is divided, another of the energy storage subunits has an energy storage subunit voltage that is different from the charging voltage, wherein for the at least partial charging of the energy storage unit, this energy storage subunit is connected via a voltage transformer to the same charging connection point as the one energy storage subunit.

2. The method according to claim 1, wherein the energy storage subunits are electrically connected to the charging connection point sequentially or electrically in parallel.

3. The method according to claim 1, wherein, for charging the other energy storage subunit, the charging voltage is converted by the voltage transformer to the energy storage subunit voltage of said other energy storage subunit.

4. The method according to claim 1, wherein the energy storage unit includes a plurality of battery modules, and when the energy storage unit is divided, at least one of the battery modules is assigned to each of the energy storage subunits.

5. The method according to claim 4, wherein the energy storage subunit is charged in such a way that when charging is completed, the final charge voltages of the battery modules of the energy storage subunits are the same.

6. The method according to claim 4, wherein when charging is completed, a check is made to determine whether the final charge voltages of the battery modules are identical, and if different final charge voltages are found, the battery modules are equalized by an equalization controller.

7. The method according to claim 4, wherein after charging, in particular once the final charge voltages are reached by the battery modules, the energy storage subunits are electrically disconnected from the charging connection point and are electrically connected to one another in series.

8. The method according to claim 6, wherein the energy storage subunits are connected in series only after equalization has been carried out by the equalization controller.

9. The method according to claim 1, wherein exactly one energy source or a plurality of electrically interconnected energy sources are electrically connected to the energy storage subunits via the charging connection point.

10. An energy storage device for a motor vehicle, in particular for carrying out the method according to claim 1, comprising:
  the energy storage device is equipped with an energy storage unit, which has an energy storage unit voltage during normal operation, and which, during a charging process, can be charged by electrical energy provided at a charging connection point at a charging voltage that is lower than the energy storage unit voltage, and wherein, based on the energy storage unit voltage and the charging voltage, the energy storage unit can be divided into a plurality of energy storage subunits, at least one of which has an energy storage subunit voltage that corresponds to the charging voltage and can be electrically connected to the charging connection point for the at least partial charging of the energy storage unit, wherein the energy storage device is configured to
    divide the energy storage unit into the plurality of energy storage subunits in such a way that the energy storage subunits each have an energy storage subunit voltage that corresponds to the charging voltage and are electrically connected to the same charging connection point for the purpose of charging the energy storage unit, or
    when the energy storage unit is divided, another of the energy storage subunits has an energy storage subunit voltage that is different from the charging voltage, wherein for the at least partial charging of the energy storage unit, this energy storage subunit is connected via a voltage transformer to the same charging connection point as the one energy storage subunit.

11. The method according to claim 1, wherein, for charging the other energy storage subunit, the charging voltage is converted by the voltage transformer to the energy storage subunit voltage of said other energy storage subunit.

12. The method according to claim 2, wherein the energy storage unit includes a plurality of battery modules, and when the energy storage unit is divided, at least one of the battery modules is assigned to each of the energy storage subunits.

13. The method according to claim 3, wherein the energy storage unit includes a plurality of battery modules, and when the energy storage unit is divided, at least one of the battery modules is assigned to each of the energy storage subunits.

14. The method according to claim 5, wherein when charging is completed, a check is made to determine whether the final charge voltages of the battery modules are identical, and if different final charge voltages are found, the battery modules are equalized by an equalization controller.

15. The method according to claim 5, wherein after charging, in particular once the final charge voltages are reached by the battery modules, the energy storage subunits are electrically disconnected from the charging connection point and are electrically connected to one another in series.

16. The method according to claim 6, wherein after charging, in particular once the final charge voltages are reached by the battery modules, the energy storage subunits are electrically disconnected from the charging connection point and are electrically connected to one another in series.

17. The method according to claim 7, wherein the energy storage subunits are connected in series only after equalization has been carried out by the equalization controller.

18. The method according to claim 2, wherein exactly one energy source or a plurality of electrically interconnected energy sources are electrically connected to the energy storage subunits via the charging connection point.

19. The method according to claim 3, wherein exactly one energy source or a plurality of electrically interconnected energy sources are electrically connected to the energy storage subunits via the charging connection point.

20. The method according to claim 1, wherein exactly one energy source or a plurality of electrically interconnected energy sources are electrically connected to the energy storage subunits via the charging connection point.

* * * * *